UNITED STATES PATENT OFFICE.

WILLIAM G. HALL, OF CALIFORNIA, PENNSYLVANIA, ASSIGNOR OF ONE-HALF TO WILLIAM K. COATSWORTH, OF CALIFORNIA, PENNSYLVANIA.

POLISH AND PROCESS OF MAKING SAME.

1,189,445. Specification of Letters Patent. Patented July 4, 1916.

No Drawing. Application filed February 27, 1915. Serial No. 11,048.

*To all whom it may concern:*

Be it known that I, WILLIAM G. HALL, a citizen of the United States, residing at California, in the county of Washington and State of Pennsylvania, have invented a new and useful Polish and Process of Making Same; of which the following is a specification.

This invention has reference to polishes, and its object is to provide a polish particularly adapted for shoes and other footwear, and also useful in connection with other leather goods.

In accordance with the present invention equal parts are taken of the wood and bark, or of the wood with the bark on of cedar, apple, walnut, hickory, elm and pine. These materials are put into a tank and covered with a mixture consisting of water, vinegar, turpentine, and beeswax in the proportion of fifty per cent. of water, thirty-five per cent. of vinegar, ten per cent. of turpentine and five per cent. of beeswax. The ingredients are then boiled until the fluid is reduced to one-half or less of its original volume, and after the fluid becomes cold it is strained and is then ready for use.

The oil or sap from the wood forms a part of the mixture and is obtained in the manner described. The beeswax is put into the tank in cake form and certain parts of it harden when the mixture is finally cooled, and this hardened part is strained off leaving only a part of the beeswax which may be termed oil of beeswax.

The prepared polish has advantage over other polishes in that the same polish without change of any kind is useful in polishing either black or tan leathers. It will not soil the hands and makes the shoes waterproof. Moreover, it does not injure the shoes, and will cleanse, restore and polish the shoes to their original condition, except for the effects of wear.

The polish itself has a color, but does not impart color to black or tan shoes, although its presence would be noticeable on white shoes. The effect of the polish on black or tan shoes seems to be due to the dye already in the leather of the shoes, since the polish itself does not dye the shoes to any material extent.

The reason why the polish acts as actual experience has shown that it does, or the reason why it appears to be necessary to use the different woods and barks named, is not known, but it seems that the effect obtained from the polish requires the presence of all the ingredients named, and in the absence of any of them the full beneficial effect of the polish is reduced.

The polish consists of an extract of the different woods and their barks, with a small amount of acid supplied by the vinegar and oily constituents due to the presence of turpentine and the oil of beeswax. A relatively large proportion of the water is driven off by the heat employed in producing the extract, and the extract is rich in the constituents of the wood and bark by reason of the long continued action of the heat which may be applied for a considerable time in order to evaporate so large a proportion as fifty per cent. or more of the liquid employed.

What is claimed is:—

1. A liquid polish for leather, consisting of a mixture of a watery extract of wood, vinegar, turpentine, and oil of beeswax with the extract predominating in quantity and the vinegar predominating in quantity over the combined amount of turpentine and oil of beeswax.

2. A liquid polish for leather, comprising a watery extract of the wood and bark of cedar, apple, walnut, hickory, elm and pine mixed with vinegar, turpentine and oil of beeswax.

3. A liquid polish for leather comprising a concentrated extract of equal parts of wood and bark of cedar, apple, walnut, hickory, elm and pine, in a mixture of water, vinegar, turpentine and beeswax, with the ingredients of the mixture before concentration in substantially the proportion of water fifty per cent., vinegar thirty-five per cent., turpentine ten per cent. and beeswax five per cent.

4. The method of producing a liquid polish for leather, consisting in boiling substantially equal parts of the wood and bark of cedar, apple, walnut, hickory, elm and pine in a liquid mixture sufficient to cover the wood and bark when placed in a tank, said mixture consisting of water, vinegar, turpentine and beeswax, with the water predominating in quantity over the other ingredients of the mixture and the vinegar predominating in quantity over the combined quantity of turpentine and beeswax, continuing the boiling until the liquid contents have been reduced to about half the original volume, and finally cooling and straining the liquid thus obtained.

In testimony, that I claim the foregoing as my own, I have hereto affixed my signature in the presence of two witnesses.

WILLIAM G. HALL.

Witnesses:
RICHARD HAWTHORNE,
R. L. JOHNSTON.